(12) United States Patent
Colas et al.

(10) Patent No.: US 7,447,234 B2
(45) Date of Patent: Nov. 4, 2008

(54) METHOD FOR THE RECONSTITUTION OF MESSAGES CONVEYED BY ONE OR MORE PACKET-SWITCHED TRANSMISSION NETWORKS

(75) Inventors: Gérard Colas, Versailles (FR); Christian Pitot, Boulogne Billancourt (FR)

(73) Assignee: Thales (FR)

( * ) Notice: Subject to any disclaimer, the term of this patent is extended or adjusted under 35 U.S.C. 154(b) by 1011 days.

(21) Appl. No.: 10/446,156

(22) Filed: May 28, 2003

(65) Prior Publication Data

US 2004/0015717 A1 Jan. 22, 2004

(30) Foreign Application Priority Data

May 28, 2002 (FR) .................... 02 06508

(51) Int. Cl.
*H04J 3/24* (2006.01)
(52) U.S. Cl. ...................... 370/474; 370/476
(58) Field of Classification Search ................. 370/473, 370/474, 476
See application file for complete search history.

(56) References Cited

U.S. PATENT DOCUMENTS

| 4,138,726 | A | | 2/1979 | Girault et al. |
|---|---|---|---|---|
| 5,375,208 | A | | 12/1994 | Pitot |
| 5,469,433 | A | * | 11/1995 | McAuley ............ 370/474 |
| 5,701,315 | A | | 12/1997 | Pitot et al. |
| 5,719,577 | A | | 2/1998 | Pitot et al. |
| 5,778,206 | A | | 7/1998 | Pain et al. |
| 5,917,828 | A | * | 6/1999 | Thompson ........... 370/474 |
| 5,920,561 | A | * | 7/1999 | Daniel et al. ......... 370/395.6 |
| 5,954,810 | A | | 9/1999 | Toillon et al. |
| 6,046,644 | A | | 4/2000 | Pitot et al. |

(Continued)

FOREIGN PATENT DOCUMENTS

DE 10039193 A1 2/2002

(Continued)

OTHER PUBLICATIONS

U.S. Appl. No. 09/331,171.

(Continued)

*Primary Examiner*—Hassan Kizou
*Assistant Examiner*—Hooman Houshmand
(74) *Attorney, Agent, or Firm*—Lowe Hauptman Ham & Berner, LLP (57) ABSTRACT

This method enables the reconstitution of messages fragmented in packets. It comprises a process for taking a census of the packets made available to a terminal (1) by transmission networks (Na, Nb) and a process for the reassembling of messages from packets listed by the census-taking process. These two processes implement a table of pointers pointing at the packets made available to the terminal (1) by the transmission networks (Na, Nb), sorted out by membership message, said pointers being placed, for each membership message, in a stack according to the order in which the packets that they point at are made available to the terminal (1) and being provided with information or status fields enabling the reporting of doubles or discrepancies between the order in which the packets of a stack are made available and the natural order of the message fragments constituted by the payloads of the packets, and the fate of the packet pointed at during the reassembling process.

16 Claims, 6 Drawing Sheets

U.S. PATENT DOCUMENTS

| | | | |
|---|---|---|---|
| 6,148,082 A * | 11/2000 | Slattery et al. | 380/212 |
| 6,204,786 B1 | 3/2001 | Bieth et al. | |
| 6,295,296 B1 * | 9/2001 | Tappan | 370/392 |
| 6,397,243 B1 | 5/2002 | Colas et al. | |
| 6,415,190 B1 | 7/2002 | Colas et al. | |
| 6,483,854 B1 * | 11/2002 | Klausmeier et al. | 370/474 |
| 6,519,655 B1 | 2/2003 | Pitot et al. | |
| 6,631,484 B1 * | 10/2003 | Born | 710/305 |
| 6,937,606 B2 * | 8/2005 | Basso et al. | 370/412 |
| 6,944,161 B2 * | 9/2005 | Sandell | 370/395.1 |
| 7,027,443 B2 * | 4/2006 | Nichols et al. | 370/394 |
| 7,089,486 B1 * | 8/2006 | Marleux et al. | 714/807 |
| 2003/0012192 A1 | 1/2003 | Dore et al. | 370/389 |
| 2003/0039250 A1 * | 2/2003 | Nichols et al. | 370/394 |
| 2003/0193949 A1 * | 10/2003 | Kojima et al. | 370/392 |
| 2003/0231596 A1 | 12/2003 | Hong | 370/252 |

FOREIGN PATENT DOCUMENTS

| | | |
|---|---|---|
| EP | 0963082 A1 | 12/1999 |

OTHER PUBLICATIONS

U.S. Appl. No. 09/462,503.
U.S. Appl. No. 09/673,666.
U.S. Appl. No. 10/205,399.
Postel, Jon: "RFC 791: Internet Protocol" Request for Comments, (Sep. 1981) pp. 1-45, XP002232216.
Zhang Tao et al: "IP-Based Base Stattions and Soft Handoff in All-IP Wireless Networks"; IEEE Personal Communications, IEEE Communications Society, US. (Oct. 2001), pp. 24-30, XP000864164; ISSN: 1070-9916.

* cited by examiner

METHOD FOR THE RECONSTITUTION OF MESSAGES CONVEYED BY ONE OR MORE PACKET-SWITCHED TRANSMISSION NETWORKS

BACKGROUND OF THE INVENTION

The present invention relates to the reconstitution, upon arrival in a terminal, of messages conveyed in fragments through a packet-switched data transmission network in which these messages may be conveyed redundantly, by several independent transmission networks, in order to increase the security of their transportation.

A switched-packet data transmission network is constituted by a meshing of transmission lines and interconnection nodes linking geographically dispersed terminals that exchange messages with each other. The packets, which are formed by datagrams of variable length, travel asynchronously, in modulated form, on transmission lines. They are redirected in interconnection nodes through which they travel until they reach their destination. Their trajectory times are variable and depend on the congestion of the interconnection nodes when they cross these nodes. They comprise payload data constituting the payload of the network and service information enabling them to be routed within the network. It is not rare that a message to be transmitted is divided among several packets. In this case, the service information of the packets provides information on the fact that these packets belong to a same message and on their relative positions within this message to enable the reconstitution of the message at destination.

The invention more specifically relates to the reconstitution of messages fragmented in packets, upon the arrival of the packets at their destination, when the same message, for reasons of security, can be conveyed redundantly by several independent transmission networks, a same packet being capable of reaching the same terminal several times through different virtual channels or paths and at points in time that are close but distinct.

Hitherto, it has been the case that, when the same message, segmented into packets, is transmitted to a same terminal, by at least two independent transmission networks, the poor reception of one packet of the message on one of the networks leads to the rejection of all the packets of the message conveyed by this network. This prevents the reconstitution of a message through a combination of the packets conveyed by the two transmission networks when packets are badly conveyed on both networks, even if these cases where the packets are badly conveyed do not concern the same packets on both networks.

SUMMARY OF THE INVENTION

The present invention is aimed at resolving this problem. It is also aimed at providing a method for the reconstitution of messages fragmented in packets, conveyed as the case may be by a single transmission network, this method being easy to implement at the input point of a terminal.

An object of the invention is a method for the reconstitution of messages fragmented in packets, conveyed to a terminal, by at least one packet-switched transmission network, each packet comprising a data payload that can constitute a message fragment and service information relating to the address of a reception port of the destination terminal, the identity of the message to which it belongs and its relative position in such a message. This method comprises a process for taking a census of the packets made available to the terminal by the transmission networks and a process for reassembling a message from packets listed by the census-taking process which implements a table of pointers pointing at the packets made available to the terminal by the transmission networks, sorted out by membership message, said pointers being placed, for each membership message, in a stack according to the order in which in the packets that they point at are placed at the disposal of the terminals and being provided with information fields or status fields used to report doubles and discrepancies between the order in which the packets of a stack are made available and the natural order of the message fragments constituted by the payloads of the packets, and the fate of the packet pointed at during the reassembling process.

Advantageously, the packet pointers of the table contain a part reserved for a reporting function to indicate whether a packet pointed at is the last packet of a message.

Advantageously, the packet pointers of the table contain a part reserved for the identification of the communications network coming from the packet pointed at.

Advantageously, the table of packet pointers is organized in the form of message descriptors, each message descriptor containing a stack of packet pointers that can be allocated to a particular message.

Advantageously, when the table of packet pointers is organized in the form of message descriptors, each message descriptor comprises, in addition to a stack of pointers, a header block containing service information on the identity of the message to which its stack of pointers is allocated, the destination address of the message to which its stack of pointers is allocated, the management of the working of its stack of pointers and the state of the reassembling of the message.

Advantageously, when the table of packet pointers is organized in the form of message descriptors, it is accompanied by a message descriptor allocation table listing the message descriptors of the table of packet pointers in the course of being allocated to messages.

Advantageously, the message reconstitution method is implemented with packets whose service information field also provide information on their length and comprises the following steps:

the storage, in a first working memory space, of the packets coming from the packet transmission networks, the creation, in a second working memory space, of the table formed by N descriptors, N being a positive integer, capable of being allocated to messages in the course of being reconstituted and by a table of descriptor allocation elements, each descriptor comprising:

a stack of M pointers, M being a positive integer, capable of being allocated to packets stored in the first working memory space, each packet pointer containing a part reserved for the address, in the first working memory space, of the packet allocated to it, a part reserved for the relative position of the packet within the message allocated to the descriptor and a part reserved for a status specifying the situation, at the current instant, of the allocated packet, during the running of a message reconstitution operation, and a header bloc with service information on the identification of the message allocated to the descriptor and the position, in the stack of packet pointers of the descriptor, of the first available pointer of the stack to be allocated, the expected maximum position of the next packet to be reassembled in the message authorizing a chaining with the last packet reassembled with the message, each descriptor allocation element designating a descriptor by associating with it a flag that reports the allocated or non-allocated state of the designated descriptor, the analysis of the service information of each packet newly arrived at the terminal, to extract therefrom the identity of the message of which it is a part and the reception port that is the addressee or recipient of this message within the terminal, a search, in the table of descriptors, by means of the table of allocation elements, for a message descriptor assigned to the message identified in the service information of the packet, when there is no allocated descriptor:

the allocation of an available descriptor of the table to the message identified in the service information of the packet and the updating of the allocation elements table, the allocation of the first available pointer of the stack of the newly assigned descriptor to the newly arrived packet currently being analyzed with an intermediate status of eligibility, and the updating of the header block of the descriptor, when there is an allocated descriptor:

the allocation, to the packet, of the first available pointer of the stack of the descriptor, the comparison of the packet with those corresponding to the already allocated pointers of the stack of the descriptor, when there is an already allocated pointer pointing at a packet having the same position in the message, the assignment, to the pointer allocated to the packet, of an intermediate status of redundancy, in the absence of an already allocated pointer pointing at a packet having the same position in the message, the assignment, to the pointer allocated to the packet, of an intermediate status of eligibility, the repetitive analysis, as a background task, of the stacks of pointers of the descriptors of the table effectively allocated to messages in order to withdraw, from the first space of the working memory, in the right order, with neither repetition nor omission, all the packets of each message undergoing reception and to transfer their payloads to a message reconstitution stack, this analysis consisting, at the level of a descriptor stack, in, taking the pointers effectively allocated to packets into consideration in the stack, by descending order of seniority, in searching for the first pointer that possesses the intermediate status of eligibility if the relative position, in the message, of the packet pointed at, extracted from the service information fields of this packet, is lower than or equal to the maximum chaining position recorded in the header block of the descriptor, depositing the payload of the packet pointed at in a message reconstitution stack, updating the maximum chaining position in the header block of the descriptor by increasing its value by the length of the deposited payload, and passing to the next pointer of the stack, if the relative position, in the message, of the packet pointed at, extracted from the service information fields of this packet, is greater than the maximum chaining position recorded in the header block of the descriptor, assigning the intermediate status of premature eligibility to the pointer, and, passing to the next pointer of the stack, as soon as a deposition has been efficiently completed changing the intermediate status of eligibility or premature eligibility of the pointer allocated to the deposited packet into a definitive status of deposition, examining the relative position of the deposited packet in the message if the deposited packet is the last packet of a message closing the message reconstitution stack, and deactivating the descriptor allocated to the message by updating the allocation elements table.

if the deposited packet is not the last packet of a message changing the status of the pointer or pointers allocated to packets having a same relative position in the message and being placed downstream in the stack with an intermediate state of redundancy into a definitive state of redundancy, searching, upstream in the stack, for the pointers allocated to packets with the intermediate status of premature eligibility, and when this search is positive, verifying the reality of the intermediate status of premature eligibility by comparing the relative position in the message of the packet pointed at, extracted from the service information fields of the packet pointed at, with a maximum chaining position located in the header block of the descriptor, if the relative position, in the message, of the packet pointed at by a pointer with the intermediate status of premature eligibility is lower than or equal to the maximum chaining position, changing the intermediate status of premature eligibility into an intermediate status of eligibility, and resuming the analysis of the stack at the allocated pointer that has undergone the change in status, as soon as a deposition fails changing the status of a pointer allocated to the packet whose deposition has failed, from an intermediate status of eligibility into a definitive status of reject, searching in the stack for another allocated pointer corresponding to the packet for which the deposition has failed but which is assigned an intermediate status of redundancy, if the search is positive changing the status of the pointer found, from intermediate status of redundancy to intermediate status of eligibility, and resuming the analysis of the pointer stack, at the level of the allocated pointer that has undergone the change in status, if the search is negative momentarily abandoning the reconstruction of the message in a mailbox memory, this reconstruction being resumed naturally at the arrival of the next fragment.

Advantageously, a message descriptor is also de-allocated in the event of the reception of packets belonging to a new message having the same final destination address as its allocation message.

Advantageously, when a message is transmitted redundantly by several transmission networks, a descriptor is de-allocated, after deposition of the last packet of a message, only upon reception of the redundant packets corresponding to this last message packet or only after the elapsing of a period of time corresponding to the maximum permissible difference between the transportation times of the transmission networks for the message considered.

Advantageously, when a new pointer is added to a message descriptor whose stack of pointers is full and in a feedback loop, it is ascertained that the old pointer overwritten by the new one thus created has a definitive status. If not, an error report may be produced.

BRIEF DESCRIPTION OF THE DRAWINGS

Other features and advantages of the invention shall appear from the following description of an embodiment given by way of an example. The description is made with reference to the appended drawings of which.

MORE DETAILED DESCRIPTION

Figure 1:
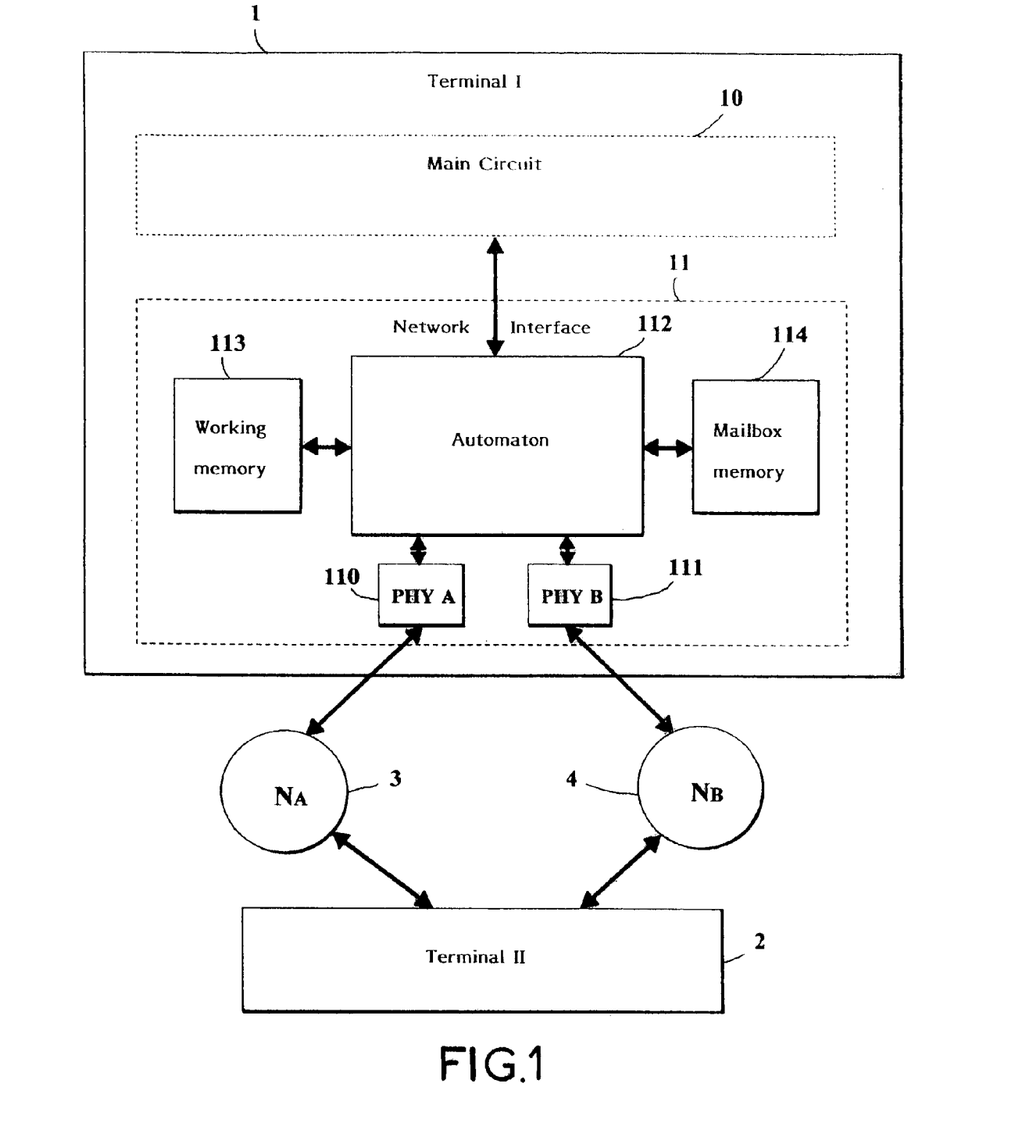
FIG. 1 is a drawing showing two terminals communicating with each other through two distinct data transmission networks, one of the terminals having its structure shown in a more detailed view so as to reveal the constitution of its points of access to the transmission networks, FIG. 2 gives a detailed view of a MAC/IP/UDP packet, FIG. 3 gives a detailed view of the composition, based on a header block and a stack of packet pointers, of a message descriptor used for the reconstitution of the messages received by a terminal by means of one or more packet-switched data transmission networks, FIG. 4 gives a detailed view of the composition of an allocation element of a table of message descriptor allocation elements.

In FIG. 1, two terminals, I, II referenced 1, 2 are more or less distant from each other and communicate through distinct transmission networks Na, Nb referenced 3, 4. Each terminal 1, 2 has a main circuit 10 performing the basic tasks for which it has been designed and a network interface circuit 11 controlling the points of access of the main circuit 10 of the terminal to the two transmission networks Na, Nb referenced 3, 4.

In the direction of reception, which will be the only direction described here below, the network interface 11 has the tasks of detecting the messages or message fragments that reach the network access points of the of the terminal 1, selecting those messages or message fragments, among the messages or message fragments detected on the network access points, that are of real interest to the terminal, reassembling the fragmented messages received and sorting out the messages selected and, as the case may be, reassembled as a function of their nature in order to present them in an ordered way to the main circuit 10 of the terminal 1.

The messages or message fragments are detected at the points of access to the networks 3, 4, on the physical propagation media used by the networks 3, 4 and they are put into binary form by analog reception circuits PHY A, PHY B referenced 110, 111. The composition of these circuits 110, 111 is highly dependent on the characteristics of the propagation media of the networks. Pure logic operations of the sequential and/or combinational type are used for the selection of messages or message fragments of interest to the terminal 1 from among the messages or message fragments that are detected at the points of access of this terminal 1 to the transmission networks 3, 4 and put in binary form by the analog reception circuits 110, 111. Such pure logic operations are also used for the reassembling of the fragmented messages and the sorting out, according to their nature, of any messages that may be reassembled. These processing operations can be performed, as shown, by means of a logic automaton 112 making use of a working random-access memory 113 and a mail random-access memory 114. The working RAM 113 is used for the temporary storage of the bits of the messages detected by the analog reception circuits 110, 111 at the network access points of the terminal 1 during the time used for the operations of message selection, sorting and reconstitution. In different stacks called reception ports, the mailbox memory 114 receives the messages resulting from the selection and reconstitution operations, sorted out by kind. This memory is designed to serve as a reception mailbox for the main circuit 10 of the terminal 1 which can consult it directly or through the logic automaton 112.

The two data transmission networks Na and Nb referenced 3, 4 are packet transmission networks. They convey messages or message fragments in the form of packets or datagrams (bit sequences). These packets or datagrams flow behind one another, asynchronously, on the links of the transmission networks, in the form of transmission signal modulations adapted to the properties of the physical medium used for transmission, the surrounding environment (in wireless transmission) or electrical optical cables (in wire-based transmission).

In a packet transmission network, the datagram constituting a packet contains useful data or payload data and service information enabling the routing of the packet within the transmission network and the reporting of certain characteristics of the packet necessary for its use in the recipient terminals. Its format or organization obeys precise rules known as physical layer protocol or first-level protocol rules, known to all the participants in the network. The payload data of the packet are gathered together in a field known as the payload data field which is itself subjected to a precise organization, known to the recipient terminals. This precise organization is often of the same type as that of a packet, again with a payload data field and a service information field. This organization of the payload data field of a packet obeys rules known as logic layer protocol or second-level protocol rules. The payload data field defined by the second-level protocol may itself have a format defined by a third-level protocol and so on and so forth so that there will often be a data packet format complying with several layers of protocols.

In particular, it is fairly frequent in a packet transmission network, to use a packet format which complies, at the first level, namely the physical layer level, with an Ethernet MAC (Media Access Control) protocol that meets an IEEE802.3 and/or 802.2 standard set up by the Institute of Electrical and Electronics Engineers and, at the second and third levels, with IP/UDP (Internet Protocol/User Datagram Protocol) or IP/TCP (Transport Control Protocol) or IP/ICMP (Internet Control Message Protocol) type Internet protocols that meet the RFC standards issued by the DARPA ("Defense Advanced Research Project Agency").

The Ethernet Mac protocol used at the first level imposes a limit on the length of a packet implying a fragmentation of the messages having lengths greater than this limit. This fragmentation of the long messages is managed at the second level by specific service information of the IP protocol.

Figure 2:
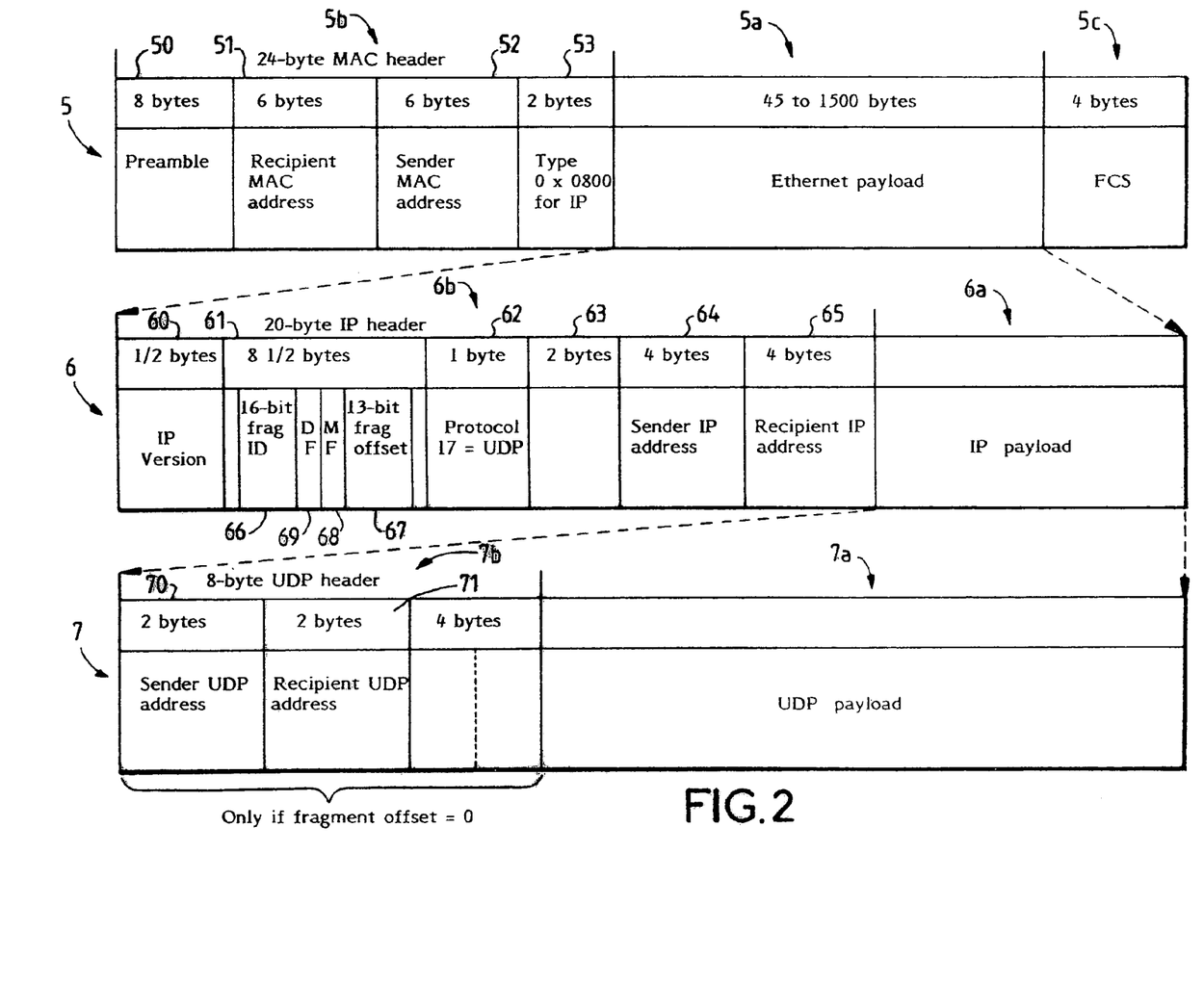

FIG. 2 gives a detailed view of the format of a packet using three layers of protocols, a first Ethernet MAC protocol level that can be applied to the physical layer of an Ethernet network proper and specifies, at this network, the overall format of a packet, a second IP protocol level that specifies the format of the Ethernet payload of the packet in the Internet framework, and a third UDP protocol level the specifies the format of the IP payload. The third-level UDP protocol is chosen by way of an illustration to show a full packet organization. It does not come into play in the reconstitution of fragmented messages and can be replaced by other Internet protocols such as the TCP protocol or the ICMP protocol.

The overall format of the packet, dictated by the MAC type first-level protocol, is given in the table 5 in the upper part of FIG. 2. The format of the Ethernet payload data field constituting the payload of the network, dictated by the IP Internet type second-level protocol, is the object of the table 6 in the middle of this FIG. 2, while the format of the IP payload data field dictated by the third-level UDP Internet type protocol is illustrated by the table 7 in the lower part of FIG. 2.

As can be seen in the table 5 at the upper part of FIG. 2, the Ethernet MAC protocol calls for the datagram of a packet to behave like a payload data field 5*a* with a length ranging from 4500 to 1500 bytes, preceded by a 24-byte header known as a MAC header 5*b* dedicated to first-level service information, that is information corresponding to the physical layer level, and followed by a cyclical redundant code 5*c* also known as an FCS ("Frame Control Sequence") taking up four bytes and relating to the totality of the packet except for the preamble.

The MAC header 5*b* consists of an eight-byte preamble 50 used for synchronization as the packet is transmitted asynchronously. This preamble is followed by a six-byte MAC recipient address 51, a six-byte MAC sender address 52 and a two-byte piece of service information 53. This information 53 is devoted either to the length of the packet in bytes if its value is below 1536, or to the type of packet, namely to the second-level protocol complied with by the MAC payload data field 5*a*, when its value is greater than 1536. When the MAC payload data field complies with an IP protocol, the expected value of the service information 53 is 0800 in hexadecimal notation.

When, as assumed, the MAC payload data field 5*a* of a packet complies with an IP protocol and the MAC header 5*b* contains a piece of information of the 53 type having the hexadecimal value 0800, the datagram that forms it is, in turn, split up as can be seen in the median table 6 of FIG. 2, into an IP payload data field 6*a* forming the payload at the level of the IP protocol, preceded by a header 6*b* called the IP header. In the example described, this header corresponds to an IPV4 protocol without optional fields and takes up 20 bytes devoted to service information concerning the second level, namely the level of the IP protocol often called the transportation logic layer.

The IP header 6*b* has a first service information field 60, with a length of half a byte, identifying the IP protocol version used and having the expected binary value 0100 for the version 4. This first field of service information 60 is followed by a set 61 of seven other service information fields occupying 8½ bytes. These seven service information fields include a two-byte fragment identifier field 66 identifying the "message of belonging" or "membership message" of the packet, a 13-bit fragment offset field 67 giving the relative position of the packet in its membership message and enabling the message to be recomposed from all the packets claiming membership and two flags, one DF flag 69 reporting whether the payload IP 6*a* corresponds to a fragmented message or not and one MF flag 68 taking the value zero to indicate that the packet corresponds to a final message fragment. The set 61 of seven fields is followed by a service information field 62 with a length of one byte, identifying the third-level protocol complied with by the IP payload data field 6*a*. When, as assumed here, the IP payload data field 6*a* meets the UDP Internet protocol, the expected value of the service information 62 is 17 in decimal notation. Following the service information field 62 identifying the third-level protocol, there is another two-byte service information field 63 and then a four-byte service information field 64 devoted to a sender IP address and a four-byte service information field 65 devoted to a recipient IP address.

When, as assumed, the IP payload data field 6*a* complies with a UDP protocol and the IP header 6*b* containing a third-level protocol identifier 62 has the decimal value 17, the datagram that forms it is, in turn, split up as shown by the table 7 at the bottom of FIG. 2 into a UDP payload data field 7*a* constituting the payload at the UDP protocol level, preceded by an eight-byte header 7*b* called a UDP header devoted to service information at the third level which is the level of the UDP protocol often called the network logic layer. The information contained in the header 7*b* is present only in packets corresponding to the first fragment of a fragmented IP payload. Such packets can be identified by a zero "fragment offset" field (67).

The UDP header 7*b* has a first two-byte service information field 70 devoted to a UDP sender address identifying a transmission port in the sender terminal. From this sender terminal, there comes the payload contained in the UDP data field 7*a*. The information field 70 is followed by a second two-byte service information field 71, devoted to a recipient UDP address identifying a reception port in the address terminal, and a set 72 of two other service information fields occupying the remaining four bytes.

The terminals (1, 2 FIG. 1) concerned by the varieties of packets complying with the MAC/IPv4/UDP protocol layers whose format has just been described in detail in FIG. 2 or with the MAC/IPv4/TCP or again with the MAC/IPv4/ICMP, protocol layers comprise, in their mailbox memory (114 FIG. 1), at least one port for the reception of messages assigned to each of these categories of packets. As the case may be, these terminals also comprise other reception ports for the packets which are addressed to it but for which the three protocol levels cannot be fully exploited, either because their second-level protocol is not of the IPv4 type, or because their third-level protocol corresponds neither to the UDP protocol nor to the TCP protocol nor to the ICMP protocol.

The operations performed on the packets by the network interface (11 FIG. 1) of an terminal (1, 2 FIG. 1) consist in selecting those packets, among the packets made available to the terminal (1, 2 FIG. 1) by the networks (3, 4 FIG. 1), that are destined for the terminal, extracting the data payload from the selected packets, determining whether this payload corresponds to a message or to a message fragment, reassembling the fragmented messages and directing the messages obtained, possibly in a defragmented state, to the appropriate reception port or ports of the mailbox memory (114 FIG. 1) of the terminal. These operations are conducted by the automaton (112 FIG. 1) of the network interface of an terminal (1, 2 FIG. 1) on the binary versions or datagrams of the packets placed in the working memory (113 FIG. 1) by the analog reception circuits (110, 111 FIG. 1) interposed before the points of access of the terminal (1, 2 FIG. 1) to the networks (3, 4 FIG. 1).

Since, in order to identify the beginning and end of a packet, the analog reception circuits (110, 111 FIG. 1) exploit the preamble (50 FIG. 2) of the header and the final field 5*c* of the cyclical redundant code of the Ethernet MAC protocol applied to the first level of the physical layer, they implicitly ensure recognition of the datagrams whose format complies with the Ethernet MAC protocol. This recognition is used to limit the processing solely to the datagrams stored in the working memory (113 FIG. 1) that are really in the Ethernet MAC format.

When it is made sure that the datagrams given by the analog reception circuits (110, 111 FIG. 1) comply with a first-level Ethernet MAC protocol, the operations for the selection of packets, recomposition of fragmented messages and sorting of messages performed by the automaton (112 FIG. 1) start with a verification of the use of an IP type second-level protocol. This verification is made by checking the value of the identifier of the second-level protocol of the packet placed, as a packet header, in the service information fields (53, FIG. 2) of the Ethernet MAC protocol devoted to the type. This identifier should have a value of 0800 in hexadecimal notation so that the second-level protocol is truly of the IP type.

When the verification of use of a second-level IP type protocol fails, the packet is subjected to a search for concordance between the value of the service information field devoted to the recipient MAC address (51, FIG. 2) and the values of the recipient MAC addresses assigned to the concerned terminal. When there is no concordance, the packet is rejected. When there is concordance, the datagram in the payload data field (6a FIG. 2) is deposited in a particular reception port of the mailbox memory 114, known as the Ethernet coarse reception port.

When the verification of use by the packet, at the second level, of an IP protocol, is positive, the packet is subjected to a search for concordance between the combination of the values of the service information fields devoted to the recipient MAC address (51, FIG. 2) and the recipient IP address (65, FIG. 2) and the combinations of recipient MAC and IP addresses assigned to the concerned terminal. The packet is rejected if there is no concordance. However, if concordance is found, it is subjected to an identification 26 of the third-level protocol used by the packet and to a message extraction operation.

The third-level protocol identification is done by closely examining the value taken by the third-level protocol identifier located, as a packet header, in the field of service information (62, FIG. 2) of the IP protocol which takes a decimal value 6 for a TCP protocol, 17 for a UDP protocol, 1 for an ICMP protocol, etc.

When the third-level protocol identifier present in the packet header reports a TCP or UDP protocol, a message reconstitution operation based on the analysis of the fragment identifier and fragmented offset fields as well as the fragmentation DF and final fragment MF fields (66, 67; 68, 69 FIG. 2), is superimposed on the search for a recipient port because the packet may correspond to a message fragment.

This operation for reconstituting a fragmented message makes use of two distinct processes that run simultaneously. The first of these is a process of taking a census, on the basis of membership message, of the packets recently received by the terminal that are in transit in the working memory (113 FIG. 1) and for which the analysis of the service information has shown that they relate to the terminal and comply with the MAC/IP/TCP or MAC/IP/UDP protocols. The second is a process of reassembly, in the right order and without omission, of the packets claiming to belong to a same message, in a stack of the mailbox memory (114, FIG. 1) placed at an address corresponding to the reception port of the concerned message.

The management of the process for taking the census of the packets recently received according to the MAC/IP/TCP or MAC/IP/UDP protocols, of interest to the terminal, and the process of reassembling the packets in messages is done by using a table of message descriptors handled by means of a message descriptor allocation table.

The table of message descriptors is stored in the working memory (113 FIG. 1). Its lists the recently received packets still in the working memory (113 FIG. 1), classified by membership message and by order of reception, and assigned a status specifying the fate that is allotted to them during the census-taking and reassembling processes. This table is constantly updated as a function of the arrival of the packets and of the states of reassembly of the messages. It contains N message descriptors each of which can be allocated to a message in the course of reception and reassembling, N taking for example the value 4096 or possibly 16 per message stream if the reception device has a capacity of 256 message streams, each of them being associated with a recipient MAC address awaited locally.

Each message descriptor is provided with a header block and a stack of packet pointers. The header block gathers information on the identity of the message in reception, assigned to the descriptor, the destination of this message within the terminal and the state of the reassembly of this message. The stack comprises M packet pointers, M taking for example the value 10, capable of being allocated to the packets received, temporarily stored in the working memory (113 FIG. 1), claiming membership of the message assigned to the descriptor. On the packet that it points at, each allocated pointer collects information on the address of this packet in the working memory (113 FIG. 1), the relative position of this packet in the message allocated to the descriptor and the state of processing of this packet during the processes of census-taking of the packets and of the reassembling of the message assigned to the descriptor, leading to the presentation of a full message in the mailbox memory (114 FIG. 1) of the terminal.

Figure 3:
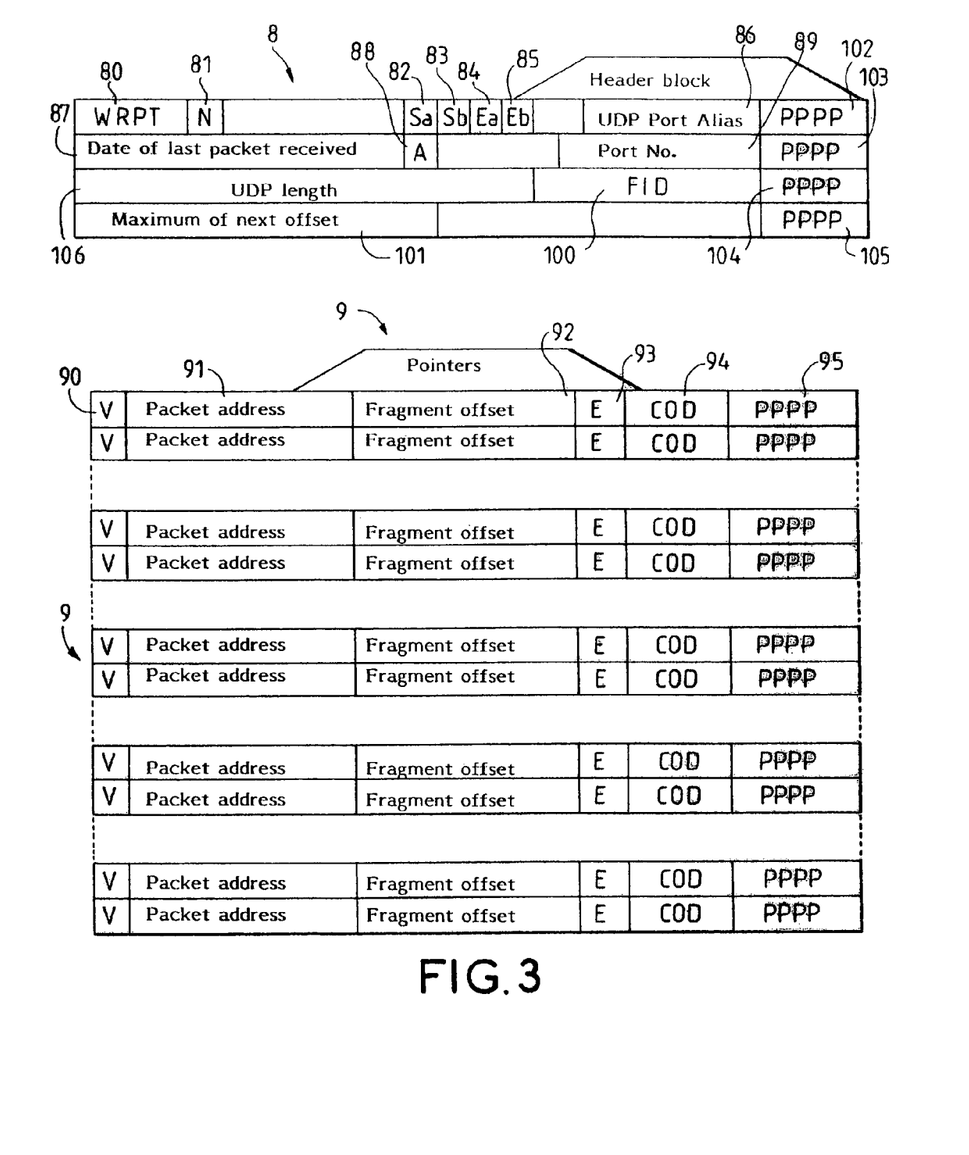

More specifically, a message descriptor header block 8 comprises, as shown in FIG. 3:

a WRPT information field 80 identifying the current write position in the stack of pointers 9, a flag N 81 indicating whether the stack of pointers of the message descriptor is full or not (when the stack of pointers is full, the set of these elements relates to fragments of the current message and must be taken into account in the reassembling process. If not, only the pointers located between the initial position 0 and WRPT relate to the current message and must be taken into account in the reassembling process), flags "Sa" 82, "Sb" 83, indicating that a packet corresponding to a first fragment of the message assigned to the descriptor has been received by the corresponding network (Na or Nb FIG. 1), flags "Ea" 84, "Eb" 85, indicating that the packet corresponding to a last fragment of the message assigned to the descriptor has been received by the corresponding network (Na or Nb FIG. 1), an information field "UDP port alias" 86 identifying the reception port assigned, at the level of the UDP protocol, to the packets and hence to the message assigned to the descriptor, a "date of last packet received" information field 87 containing the date of the last allocation, to a received packet, of a pointer of the stack of the descriptor, a warning flag "A" 88 activated when the last allocation of a pointer of the stack of the descriptor goes back to a date whose seniority is about to exceed the capacities of measurement of the clock (a problem of a looping back on the clock time counter), a "port number" information field 89 giving the local address, in the concerned terminal, of the identified reception port, at the UDP protocol level, in the "UDP port alias" information field 86, an "UDP length" information field 106 devoted to the length of the UDP payload of the datagram being received, which is a piece of information located in the service information field of any first packet at the level of the MAC/IP/UDP protocols and providing information on the length of the message, an "FID" information field 100 devoted to the message identifier formed by the contents of the "Frag ID" field located in the service information fields (66 FIG. 2) of any packet at the level of the MAC/IP protocols, a "maximum next offset" information field 101 whose value corresponds to the sum of the fragment offset and the length of the payload of the last packet received and successfully transferred into the mailbox memory 114, and fields of "PPPP" parity bits 102, 103, 104, 105 enabling a detection of error.

A packet pointer of the stack 9 of message descriptors comprises, for its part:

a "V" flag 90 indicating the original network (Na or Nb FIG. 1) of the packet assigned to the pointer, a "packet address" information field 91 giving the address, in the working memory, of the packet assigned to the pointer, a "fragment offset" information field 92 devoted to the relative position, in the message corresponding to the descriptor, of the payload of the packet assigned to the pointer, this relative position being extracted from the "frag offset" field located in the service information field (67 FIG. 2) of any packet at the level of the MAC/IP protocols, an "E" flag 93 reporting the fact that the packet assigned to the pointer corresponds to a last message fragment, this "E" flag corresponding to the "MF" flag (68 FIG. 2) located in the control flags of the IP protocol layer of the packet assigned to the pointer, a "COD" three-bit field 94 corresponding to a changing status assigned to the packet pointed to, as a function of its future in the course of the operations for taking a census of the packets claiming membership of the message assigned to the descriptor and for reassembling these packets to reconstitute the message, this status constituted by a three-digit binary number making it possible to distinguish eight different situations per packet, and a field of "PPPP" parity bits 95 enabling an error detection.

Figure 4:
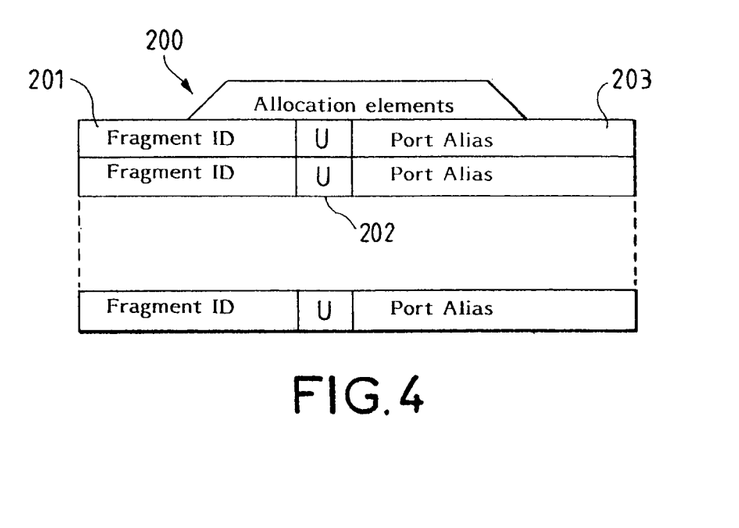

The message descriptors allocation table lists those active message descriptors, in the table of message descriptors, that are currently being used by messages being reassembled. As can be seen in FIG. 4, it contains a stack 200 of allocation elements each pointing at a particular message descriptor in the message descriptor table. Each allocation element contains:

a "fragment ID" information field 201 identifying the message currently being allocated to the descriptor pointed at, or having been allocated to it in the past, a "U" flag 202 indicating whether the descriptor pointed at is or is not currently being allocated to a message being reassembled, and a "port alias" information field 203 repeating the "UDP Port alias" information field 86 of the header block 8 of the descriptor pointed at, containing the final recipient address of the message.

The process of taking the census of the packets by membership messages is undertaken each time that the terminal receives a packet coming from one of the communications networks (Na or Nb FIG. 1), mentioning MAC and IP recipient addresses corresponding to the terminal, complying with the formats of the MAC/IP/TCP or MAC/IP/UDP protocols. It starts with the search, in the table of message descriptors, of a descriptor already allocated to the membership message of the packet. This search is made by means of the message descriptor allocation table 200 which limits its domain solely to the descriptors of the table of message descriptors already allocated to messages currently being reassembled. The message descriptors designated by the allocation elements of the allocation table 200, which have a "U" allocation flag 202 in the allocated state, are analyzed to find out of one of them does not correspond to the membership message of the packet. Two cases may arise. Either a descriptor of this kind does not exist or it exists.

When the message descriptors allocation table 200 has no allocation table with a "U" allocation flag 202 in the allocated state designating a message descriptor allocated to the membership message of the packet, signifying that there is no active message descriptor allocated, in the table of message descriptors, to the membership message of the packet, then such a descriptor is created in the table of message descriptors and the allocation element that designates it in the message descriptors allocation table 200 is updated. More specifically, this consists in:

making a search, in the message descriptors allocation table 200, for an allocation element with a "U" allocation flag 202 in the non-allocated state, making the "U" allocation flag 202 of this allocation element pass from the non-allocated state to the allocated state, updating the "fragment ID" information field of this allocation element to make it correspond to that of the packet currently undergoing a census operation, initializing the WRPT field of the header block of the message descriptor designated by the concerned allocation element, at an agreed initial value (0 for example), initializing the flag N of the header block of the message descriptor designated by the concerned allocation element at the value indicating an incomplete table of pointers, initializing the other information fields of the header bloc of the message descriptor designated by the concerned allocation element and providing them with information to make them correspond to the membership message of the packet, initializing the pointers of the stack of the message descriptor designated by the allocation element considered in providing information to the E, V, "packet address", "fragment offset" and COD fields, and establishing the different values of the PPPP bits.

When there is a descriptor, in the message descriptors table, allocated to the membership message of the packet, then the packet is allocated the first free pointer of the stack of the descriptor, whose address is deduced from the "WRPT" field of the header block of the descriptor. This allocation consists in providing information to its "V", "E", "packet address" and "fragment offset" fields, assigning a status to the packet in the "COD" information field, determining the values of the PPPP parity bits of the pointer and causing the WRPT field to evolve. The rule chosen for example, as a rule of evolution of WRPT, will be a simple implementation with looping back to the initial value when WRPT has reached its maximum value, this action being associated with the updating of the E flag so as to report a full stack of pointers.

When a new pointer is added to a message descriptor whose stack of pointers is full, it is ascertained that the old pointer overwritten by the new pointer thus created has a definitive status. If not, an error report may be produced.

The status assigned to a packet pointed at in the table of the message descriptor is changeable and can be used to track the fate allotted to the packet pointed at during the processes of the census-taking of the packets and the reassembling of the messages.

Figure 5:
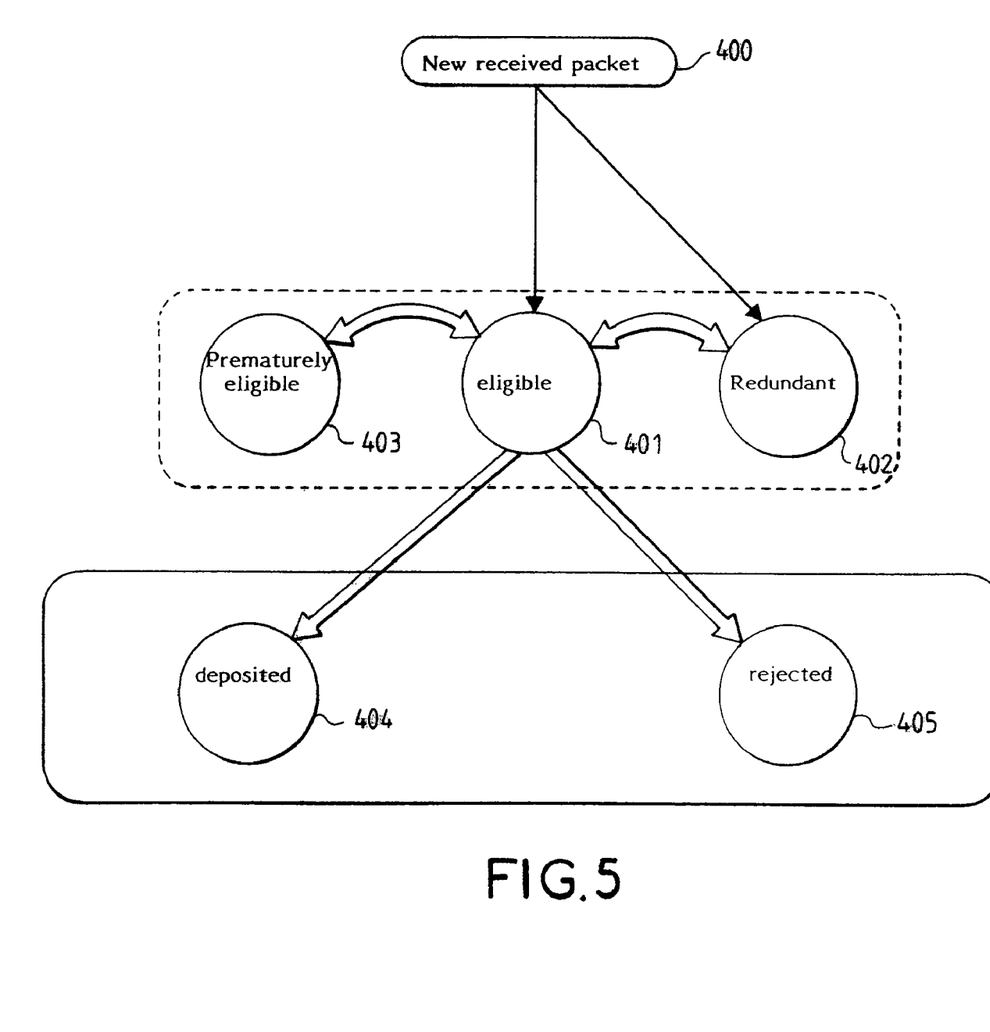
FIG. 5 is a drawing that illustrates the possible changes of status affecting the pointers of a stack of message descriptors during the reconstitution of the corresponding message.

The diagram of FIG. 5 illustrates the possible changes in status for a recently received packet, identified by a pointer of a descriptor stack, when the message corresponding to the descriptor is capable of reaching the terminal redundantly by two distinct packet transmission networks (Na and Nb FIG. 1). FIG. 5 shows arrows in fine lines corresponding to actions of the census-taking process and arrows in bold lines corresponding to actions of the reassembling process.

When a packet 400 newly received by the terminal deserves the allocation of a pointer in the table of message descriptors, it can be assigned an intermediate status at its pointer. This status is either an intermediate eligibility status 401, or an intermediate redundancy status 402.

The choice of the intermediate status assigned to the packet is made when a newly received packet, temporarily stored in the working memory (113, FIG. 1), is allocated a message descriptor pointer within the table of message descriptors, i.e. after the analysis of the service information fields of the packet has shown that the packet complies with the MAC/IP/TCP or MAC/IP/UDP protocols and has recipient addresses according to the MAC and IP protocols assigned to the terminal, and after a descriptor corresponding to the message identified in the "fragment identification" service information field of the packet has been found or created in the message descriptors table/This choice of intermediate status is made after a comparison of the "fragment offset" service information fields of the packet with those of all the other packets pointed at by the already allocated pointers of the stack of pointers of the descriptor.

If one of the pointers already allocated to the stack of the descriptor, has the same "fragment offset" field value, the pointer allocated to the newly received packet is assigned the intermediate redundancy status 402 because it points to a packet already referenced in the table of descriptors.

If none of the already allocated pointers of the stack of the descriptors has the same "fragment offset" field value, the newly received packet is assigned the intermediate eligibility status 401.

When the descriptor is created at the reception of a packet belonging to a message for which there is no prior existence of a corresponding message descriptor, the "maximum next offset" field of the header block of the descriptor takes the value 0. This indicates that the first packet to be deposited must correspond to a first fragment and must have a "fragment offset" service information field containing a zero value.

The two intermediate statuses, namely the intermediate redundancy status 402, and the intermediate eligibility status 401 are provisional intermediate statuses assigned to a packet during the census-taking process. These statuses may be modified by the message reassembling process as a function of the random factors encountered.

Indeed, the message reassembling process, which runs in parallel with the census-taking process, uses the message descriptors allocation table and the message descriptors table initiated by the census-taking process to detect the messages currently in reception reported by the descriptors currently being allocated. This process is based on the sorting out, by membership message, of the recently received packets and on checks already made on doubles in the message descriptor table to reconstitute the fragmented messages while at the same time avoiding the doubles and omissions of fragments.

To do this, the message reassembling process carries out a periodic analysis of the descriptors of the message descriptors table designated, as is the case during allocation, by the allocation elements of the message descriptors allocation table.

During this periodic analysis, the process assigns each message having an allocated descriptor (with the allocation flag of the allocation element designating it in the allocated state) a particular stack in the mailbox memory (114, FIG. 1), at an address deduced from the values taken by the "UDP port alias" and "port number" information fields of the header block of the descriptor (8, FIG. 3) and then exploits the stack of pointers of each allocated descriptor.

The exploitation, by the message reassembling process, of a stack of pointers of an allocated descriptor starts with the identifying of the useful part of the stack by using the N flag and the WRPT field of the header block of the descriptor. It continues with the inspection of this useful part in order to make a search therein for the packet corresponding to the one expected at that very instant, in the stack of the mailbox memory reserved for the allocation message of the descriptor and to transfer its payload from the working memory to the mailbox memory.

The useful part of the stack of pointers of a descriptor is inspected by following the direction of recording of the stack and is limited to the pointers having an intermediate eligibility status 401 or, as shall be seen here below, a premature eligibility status 403. The search, among these pointers, for the one allocated to the packet expected at that very instant in the stack of the mailbox memory reserved for the allocation message of the descriptor, consists in finding the pointer with the intermediate eligibility status 401 or intermediate premature eligibility status 403 having an "fragment offset" information field value smaller than or equal to the value of the "maximum next offset" information field located in the header block of the descriptor which gives the upper limit of the offset value of the packet expected in the stack of the mailbox memory.

If the value of the "offset value" information field of a tested pointer is greater than the value of the "maximum next offset" information field of the header block of the descriptor, the reassembling process does not transfer its payload into the stack of the mailbox memory assigned to the message because such a transfer would be premature. However, it leaves a trace of its passage in giving the tested pointer an intermediate premature eligibility status 403, if the pointer does not already have such a status, to report the fact that this pointer needs to be tested again only after the effective transfer of the payload from another packet.

If the value of the "offset value" information field of the pointer currently under analysis is smaller than or equal to the value of the "maximum next offset" information field of the header block of the descriptor, the reassembling process carries out the effective transfer of the payload of the packet pointed at in the stack of the mailbox memory assigned to the message.

After each successful transfer of the payload of a packet, from the working memory (113, FIG. 1) to the mailbox memory (114, FIG. 1), the reassembling process updates the "maximum next offset" information field of the header block of the descriptor by increasing the previous value of this field by the length of the payload deposited and changes the status of the pointer allocated to the transferred packet into a definitively deposited status 404, thus enabling the exclusion of the pointer from the next analysis of the stack by the reassembling process. It then makes a search, upstream from the same stack, for any pointers assigned an intermediate status of premature eligibility 403. If such pointers exist, it resumes its analysis of the stack at the oldest pointer found. If not, it continues its analysis of the stack by the next pointer.

If it is not able to transfer a packet, it modifies the status of the manipulated pointer into a status of a definitive reject 405 then searches downstream, in the same stack, among the pointers having the intermediate redundancy status 402, for a pointer allocated to a packet having a same value of "fragment offset" information field. In the event of success, it changes the intermediate status of the found pointer from redundancy 402 to eligibility 401 and resumes its analysis of the stack from the pointer with its intermediate status changed from redundancy to eligibility. Should there be a failure of the search, the transfer is temporarily abandoned. It will be resumed with the arrival of the next fragment or will be definitively abandoned if this event has not occurred at the end of a period of time corresponding to the maximum difference between the conveyance times of the two redundant networks.

At each successful transfer of the payload of a last packet of a message, reported by the E flag (93, FIG. 3), into a stack of the mailbox memory (114, FIG. 1), the reassembling process reports the fact that the mailbox memory stack used contains a full message at the disposal of the terminal.

The message descriptor is closed (the flag of the allocation element designating it is placed in the non-allocated state) when the pointer of the redundant packet associated with the last packet of the message is present in its stack or when a period of time greater than the time corresponding to the maximum acceptable difference between the transportation times of the two networks has elapsed or again, when a new message is received with the same final destination address in the equipment.

Such situations are detected by means of a background task in which the headers of the allocated descriptors are periodically scanned and the "date of last packet received" field is compared with the current date. This background task also updates the flag A (88, FIG. 3).

Figure 6:
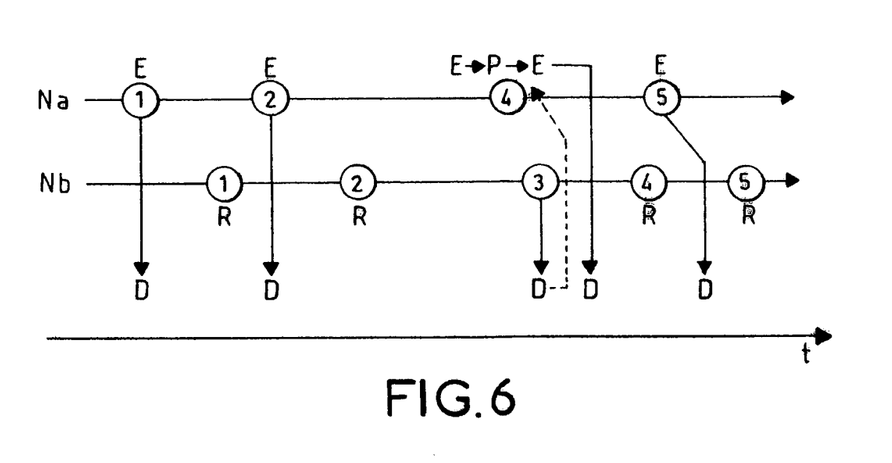
FIG. 6 is a drawing illustrating the handling operation performed, during the reconstitution of a message, among the newly received packets claiming to belong to this message.

FIG. 6 is a timing diagram showing the determination of the statuses of the packet pointers of a descriptor of the message descriptor table during the process of the census of the newly received packets and the modifications if any of these statuses during the process of reassembling in the case of a start of a fragmented message reaching the terminal both through the packet-switched communications network Na and through the packet-switched communications network Nb.

The packets corresponding to the fragments of the message are sent, thereafter, in the natural order of the fragments, by two independent virtual paths, one taking the transmission network Na and the other taking the transmission network Nb and are received in parallel, totally independently and asynchronously, by the two analog reception circuits (110, 11 FIG. 1) of the terminal. In FIG. 6, the packets received by the terminal and corresponding to the first five fragments of the same message are schematically represented by circles indexed by a digit corresponding to their rank in the message. The circles are placed on two lines parallel on the time scale: a first line corresponds to the packet conveyed by the transmission network Na and the second line corresponds to the packet conveyed by the transmission network Nb. The situation represented is one in which a transmission network Na offers the message packets transportation times that are shorter than those of the transmission network Nb but has lost the packet corresponding to the third fragment of the message. However, this third fragment arrives by the transmission network Nb, delayed with respect to the packet corresponding to the fourth message fragment conveyed by the transmission network Na.

In the process of taking the census of the newly received packets, all these packets are allocated pointers, in the table of message descriptors, coming from the stack of a same descriptor. The packets received from the transmission network Na have their pointers assigned the intermediate eligibility status E, since they are the first to have arrived at the terminal. The first two packets received from the network Nb have their pointers assigned the intermediate redundancy status since they had already reached the terminal through the transmission network Na. The third packet is not transmitted integrally by the transmission network Na. This is indicated in FIG. 6 by the fact that it is marked with a cross but it nevertheless reaches the terminal through the transmission network Nb. On the network Nb it is assigned an intermediate eligibility status since it is the first to reach the terminal. Since the following packets are transmitted without omission by the two transmission networks Na and Nb, with the transmission network Na being ahead of the transmission network Nb, their pointers are assigned the intermediate eligibility status E for the packets coming from the transmission network Na and the intermediate redundancy status R for the packets coming from the transmission network Nb.

In the reassembling process, the first two packets coming from the transmission network Na have their payloads transferred from the working memory (113, FIG. 1) to the mailbox memory (114, FIG. 1) and the status of their pointers passes from the intermediate eligibility status to the status of being definitively deposited while the first two packets coming from the transmission network Nb, considered to be redundant, are set aside and the status of their pointers goes from the intermediate redundancy status to the definitive reject status. The fourth packets coming from the transmission network Na has its transfer rejected and its pointer goes from the intermediate eligibility status to the intermediate premature eligibility status (E⇒P) since the third packet is lacking when it is first taken into account. The third packet coming from the transmission network Nb is transferred in turn into the mailbox memory after the first two packets, its pointer going from the intermediate eligibility status to the status of being definitively deposited.

The search for pointers in the intermediate premature eligibility status, which was begun upstream in the stack of pointers following the transfer of the third packet that revealed a pointer pointing at a fourth packet coming from the transmission network Na, causes the intermediate premature eligibility status of this pointer to be challenged. This status is changed into an intermediate eligibility status (P⇒E) since the third packet has just been transferred and since it becomes the next packet to be transferred. It is then transferred (E⇒D) followed by the fifth packet coming from the transmission network Na and so on and so forth.

In the example that has just been described with reference to FIG. 6, the census-taking and reassembling processes favor the reconstitution of a message from packets transmitted by the transmission network Na, the packets transmitted by the transmission network Nb being used only to mitigate defects in the transmission of the packets by the network Na. This is often the case in practice when, for reasons of security, a message is transmitted in parallel by two transmission networks because one is often considered to be a main transmission network for the message in question while the other is considered to be an auxiliary transmission network. Here, to convey the message, the main transmission network uses a virtual path with better performance in transportation time and jitter than the auxiliary transmission network. It is possible however to make the reassembling process adopt the other criteria of the choice of the version of the packet whose payload is transferred into a stack of the mailbox memory, when several versions of the same packet are available at reception from several transmission networks. These criteria may include a preference for a particular transmission network for a given message since the packet pointers of the stacks of the descriptors of the table of message descriptors contains an information field giving the transmission network used by the packet pointed at. They may also be minimalist and include no preference for any transmission network.

Figure 7:
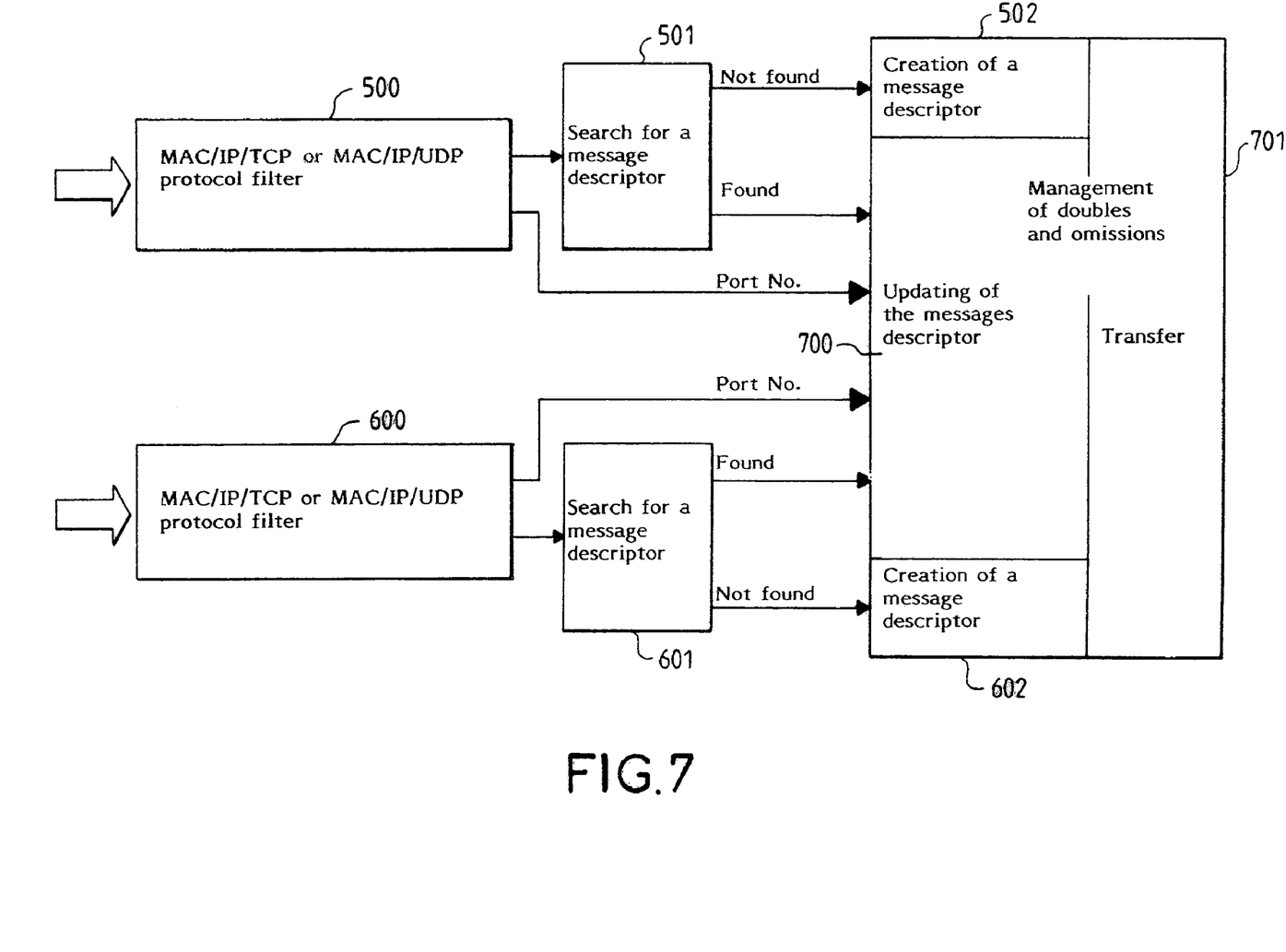
FIG. 7 is a drawing illustrating the processing operations undergone by the packets, from their delivery to a terminal by the transmission networks that carry out their transportation up till the reconstitution of the messages that form them.

The processing undergone by the packets of a fragmented message that reach a terminal redundantly by two independent transmission networks Na and Nb is summarized in the diagram of FIG. 7. The packets conveyed to the terminal by each of the two transmission networks Na and Nb are received by the terminal at distinct inputs specialized with respect to each transmission network. These packets are processed by analog reception circuits (PHY a, PHY b, FIG. 1) that carry out checks on their integrity and put them into binary form. Once in binary form, they are stored provisionally in a working memory pending the time when their service information fields are exploited to find out the nature, validity and destination of their payload. After having been placed in binary form, the packets originating from each of the two transmission networks Na and Nb undergo a protocol filtering operation 500 and 600 respectively. This operation consists in ascertaining that they have a format verifying either the MAC/IP/UDP protocols or the MAC/IP/TCP protocols. The fact that a packet successfully goes through a protocol filter 500 or 600 implies that its service information fields have delivered the destination of the packet in the terminal (port number) and the identity of the message to which the packet claims to belong. The identity of the message to which the packet belongs is used for a search 501, 601, in a table of message descriptors, for a descriptor allocated to its message. If the table of descriptors does not contain any descriptor allocated to the membership message of the newly received packet currently under analysis, such a descriptor is created at 502, 602. If the table of descriptors contains a descriptor allocated to the membership message of the newly received packet currently under analysis or after the creation of such a descriptor, the newly received packet currently under analysis is listed in the stack of pointers of the descriptor of its membership message by the allocation to it, at 700, of the first two free pointers of the stack with a status reporting the doubles (intermediate redundancy status). Simultaneously, the stacks of pointers allocated, in the table of message descriptors, to newly received packets are systematically analyzed, at 701, in the same direction as they are written, to reassemble the fragmented messages into several packets. For each message, the reassembling consists, firstly, in extracting the payload of the packets stored in the working memory (113 FIG. 1) and pointed at by the pointers of the stack of the descriptors of the message, in the order given by the stacks, so long as there is nothing missing in the natural ordering of the fragments of the message or of the double, secondly, in seeking to replace, in the right ordering, the payload of a packet pointed at by a pointer assigned a status of premature eligibility in delaying the time when it is taken into account until this status becomes unjustified and, thirdly, in ignoring the doubles unless there is a lack of success in the extractions of the payloads from the packets that they duplicate.

Many variants can be made in the embodiment that has just been described. In particular, the table of allocation elements of descriptors can be eliminated provided that a flag is caused to be present in the header blocks of the message descriptors of the tables of message descriptors: this flag is devoted to their allocated or non-allocated state. The elimination of the allocation elements table implies that the search for a descriptor allocated to the membership message of a packet is no longer done in two steps but in only one step, since its domain is no longer limited to the allocated descriptors alone but can be extended to all the descriptors of the table, whether allocated or not.

What is claimed is:

1. A method of reconstituting messages fragmented in packets, conveyed to a recipient terminal, by a packet-switched transmission network, each packet comprising a data payload constituting a message fragment and service information relating to the address of a reception port of the recipient terminal, the identity of the message to which it belongs and its relative position in such a message, the service information field also provide information on their length, wherein the method comprises the following steps:

receiving packets from packet transmission networks and storing the received packets, creating in a second working memory space, a table formed by N descriptors, N being a positive integer, allocated to messages in the course of being reconstituted and by a table of descriptor allocation elements, each descriptor comprising:

a stack of M pointers, M being a positive integer, allocated to packets stored in the first working memory space, each packet pointer containing a part reserved for the address, in the first working memory space, of the packet allocated to it, a part reserved for the relative position of the packet within the message allocated to the descriptor and a part reserved for a status specifying the situation, at the current instant, of the allocated packet, during the running of a message reconstitution operation, and a header bloc with service information on the identification of the message allocated to the descriptor and the position, in the stack of packet pointers of the descriptor, of the first available pointer of the stack to be allocated, the expected maximum position of the next packet to be reassembled in the message authorizing a chaining with the last packet reassembled with the message, each descriptor allocation element designating a descriptor by associating with it a flag that reports the allocated or non-allocated state of the designated descriptor, the analysis of the service information of each packet newly arrived at the terminal, to extract therefrom the identity of the message of which it is a part and the reception port that is the addressee or recipient of this message within the terminal, a search, in the table of descriptors, by means of the table of allocation elements, for a message descriptor assigned to the message identified in the service information of the packet, when there is no allocated descriptor:

the allocation of an available descriptor of the table to the message identified in the service information of the packet and the updating of the allocation elements table, the allocation of the first available pointer of the stack of the newly assigned descriptor to the newly arrived packet currently being analyzed with an intermediate status of eligibility, and the updating of the header block of the descriptor, when there is an allocated descriptor:

the allocation, to the packet, of the first available pointer of the stack of the descriptor, the comparison of the packet with those corresponding to the already allocated pointers of the stack of the descriptor, when there is an already allocated pointer pointing at a packet having the same position in the message, the assigning, to the pointer allocated to the packet, of an intermediate status of redundancy, in the absence of an already allocated pointer pointing at a packet having the same position in the message, the assigning, to the pointer allocated to the packet, of an intermediate status of eligibility, the repetitive analysis, as a background task, of the stacks of pointers of the descriptors of the table effectively allocated to messages in order to withdraw, from the first space of the working memory, in the right order, with neither repetition nor omission, all the packets of each message undergoing reception and to transfer their payloads to a message reconstitution stack, this analysis consisting, at the level of a descriptor stack, in, taking the pointers effectively allocated to packets into consideration in the stack, by descending order of seniority, in searching for the first pointer that possesses the intermediate status of eligibility if the relative position, in the message, of the packet pointed at, extracted from the service information fields of this packet, is lower than or equal to the maximum chaining position recorded in the header block of the descriptor, depositing the payload of the packet pointed at in a message reconstitution stack, updating the maximum chaining position in the header block of the descriptor by increasing its value by the length of the deposited payload, and passing to the next pointer of the stack, if the relative position, in the message, of the packet pointed at, extracted from the service information fields of this packet, is greater than the maximum chaining position recorded in the header block of the descriptor, assigning the intermediate status of premature eligibility to the pointer, and, passing to the next pointer of the stack, as soon as a deposition has been completed changing the intermediate status of eligibility or premature eligibility of the pointer allocated to the deposited packet into a definitive status of deposition, examining the relative position of the deposited packet in the message if the deposited packet is the last packet of a message closing the message reconstitution stack, and deactivating the descriptor allocated to the message by updating the allocation elements table, if the deposited packet is not the last packet of a message changing the status of the pointer or pointers allocated to packets and placed immediately downstream in the stack with an intermediate state of redundancy into a definitive state of redundancy, searching, upstream in the stack, for the pointers allocated to packets with the intermediate status of premature eligibility, and when this search is positive, verifying the reality of the intermediate status of premature eligibility by comparing the relative position in the message of the packet pointed at, extracted from the service information fields of the packet pointed at, with a maximum chaining position located in the header block of the descriptor, if the relative position, in the message, of the packet pointed at by a pointer with the intermediate status of premature eligibility is lower than or equal to the maximum chaining position, changing the intermediate status of premature eligibility into an intermediate status of eligibility, and resuming the analysis of the stack at the allocated pointer that has undergone the change in status, as soon as a deposition fails changing the status of a pointer allocated to the packet whose deposition has failed, from an intermediate status of eligibility into a definitive status of reject, searching in the stack for another allocated pointer corresponding to the packet for which the deposition has failed but which is assigned an intermediate status of redundancy, if the search is positive changing the status of the pointer found, from intermediate status of redundancy to intermediate status of eligibility, and resuming the analysis of the pointer stack, at the level of the allocated pointer that has undergone the change in status, if the search is negative momentarily abandoning the reconstruction of the message in a mailbox memory, this reconstruction being resumed naturally at the arrival of a packet corresponding to the next fragment.

2. The method according to claim 1, wherein a message descriptor is de-allocated in the event of the reception by the terminal of packets belonging to a new message having the same final destination address as its allocation message.

3. The method according to claim 1, applied in the context of messages transmitted redundantly by several transmission networks, wherein a descriptor is de-allocated, after deposition of the last packet of a message, only upon reception of the redundant packets corresponding to this last message packet or only after the elapsing of a period of time corresponding to the maximum permissible difference between the transportation times of the transmission networks for the message considered.

4. The method according to claim 1, applied in the context of descriptors having stacks of pointers looped back on themselves, the method further comprising a step to verify the definitive status of the pointers of the stack of descriptors when they are overwritten by the allocation of a new pointer, an error report being produced when an overwritten pointer has an intermediate status.

5. A method of reconstituting messages fragmented in packets, conveyed to a recipient terminal, by a packet-switched transmission network, each packet comprising a data payload constituting a message fragment and service information relating to the address of a reception port of the recipient terminal, the identity of the message to which it belongs and its relative position in such a message, wherein said method comprises:

taking a census of the packets made available to the recipient terminal by the transmission network, reassembling a message from packets listed by the census-taking process by implementing a table of pointers pointing at the packets made available to the terminal by the transmission networks, sorted out by membership message; placing the pointers for each membership message, in a stack according to the order in which in the packets that they point at are placed at the disposal of the terminals and being provided with information fields or status fields used to report doubles and discrepancies between the order in which the packets of a stack are made available and the natural order of the message fragments constituted by the payloads of the packets, and the fate of the packet pointed at during the reassembling process;

wherein, the service information field also provide information on their length, wherein the census-taking further comprises the following steps:

receiving packets from packet transmission networks and storing the received packets creating, in a second working memory space, a table formed by N descriptors, N being a positive integer, capable of being allocated to messages in the course of being reconstituted and by a table of descriptor allocation elements, each descriptor comprising:

a stack of M pointers, M being a positive integer, capable of being allocated to packets stored in the first working memory space, each packet pointer containing a part reserved for the address, in the first working memory space, of the packet allocated to it, a part reserved for the relative position of the packet within the message allocated to the descriptor and a part reserved for a status specifying the situation, at the current instant, of the allocated packet, during the running of a message reconstitution operation, and a header bloc with service information on the identification of the message allocated to the descriptor and the position, in the stack of packet pointers of the descriptor, of the first available pointer of the stack to be allocated, the expected maximum position of the next packet to be reassembled in the message authorizing a chaining with the last packet reassembled with the message.

6. The method according to claim 5, implemented with packets whose service information field also provide information on their length, wherein the method comprises the following steps:

each descriptor allocation element designating a descriptor by associating with it a flag that reports the allocated or non-allocated state of the designated descriptor, the analysis of the service information of each packet newly arrived at the terminal, to extract therefrom the identity of the message of which it is a part and the reception port that is the addressee or recipient of this message within the terminal, a search, in the table of descriptors, by means of the table of allocation elements, for a message descriptor assigned to the message identified in the service information of the packet.

7. The method according to claim 6, implemented with packets whose service information field also provide information on their length, wherein the method comprises the following steps:

when there is no allocated descriptor:

the allocation of an available descriptor of the table to the message identified in the service information of the packet and the updating of the allocation elements table, the allocation of the first available pointer of the stack of the newly assigned descriptor to the newly arrived packet currently being analyzed with an intermediate status of eligibility, and the updating of the header block of the descriptor.

8. The method according to claim 7, implemented with packets whose service information field also provide information on their length, wherein the method comprises the following steps:

when there is an allocated descriptor:

the allocation, to the packet, of the first available pointer of the stack of the descriptor, the comparison of the packet with those corresponding to the already allocated pointers of the stack of the descriptor.

9. The method according to claim 8, implemented with packets whose service information field also provide information on their length, wherein the method comprises the following steps:

when there is an already allocated pointer pointing at a packet having the same position in the message, the assigning, to the pointer allocated to the packet, of an intermediate status of redundancy.

10. The method according to claim 9, implemented with packets whose service information field also provide information on their length, wherein the method comprises the following steps:

in the absence of an already allocated pointer pointing at a packet having the same position in the message, the assigning, to the pointer allocated to the packet, of an intermediate status of eligibility, the repetitive analysis, as a background task, of the stacks of pointers of the descriptors of the table effectively allocated to messages in order to withdraw, from the first space of the working memory, in the right order, with neither repetition nor omission, all the packets of each message undergoing reception and to transfer their payloads to a message reconstitution stack, this analysis consisting, at the level of a descriptor stack, in, taking the pointers effectively allocated to packets into consideration in the stack, by descending order of seniority, in searching for the first pointer that possesses the intermediate status of eligibility.

11. The method according to claim 10, implemented with packets whose service information field also provide information on their length, wherein the method comprises the following steps:

if the relative position, in the message, of the packet pointed at, extracted from the service information fields of this packet, is lower than or equal to the maximum chaining position recorded in the header block of the descriptor, depositing the payload of the packet pointed at in a message reconstitution stack, updating the maximum chaining position in the header block of the descriptor by increasing its value by the length of the deposited payload, and passing to the next pointer of the stack.

12. The method according to claim 11, implemented with packets whose service information field also provide information on their length, wherein the method comprises the following steps:

if the relative position, in the message, of the packet pointed at, extracted from the service information fields of this packet, is greater than the maximum chaining position recorded in the header block of the descriptor, assigning the intermediate status of premature eligibility to the pointer, and, passing to the next pointer of the stack.

13. The method according to claim 12, implemented with packets whose service information field also provide information on their length, wherein the method comprises the following steps:

as soon as a deposition has been efficiently completed changing the intermediate status of eligibility or premature eligibility of the pointer allocated to the deposited packet into a definitive status of deposition, examining the relative position of the deposited packet in the message.

14. The method according to claim 13, implemented with packets whose service information field also provide information on their length, wherein the method comprises the following steps:

if the deposited packet is the last packet of a message closing the message reconstitution stack, and deactivating the descriptor allocated to the message by updating the allocation elements table, if the deposited packet is not the last packet of a message changing the status of the pointer or pointers allocated to packets and placed immediately downstream in the stack with an intermediate state of redundancy into a definitive state of redundancy, searching, upstream in the stack, for the pointers allocated to packets with the intermediate status of premature eligibility, and when this search is positive, verifying the reality of the intermediate status of premature eligibility by comparing the relative position in the message of the packet pointed at, extracted from the service information fields of the packet pointed at, with a maximum chaining position located in the header block of the descriptor.

15. The method according to claim 14, implemented with packets whose service information field also provide information on their length, wherein the method comprises the following steps:

if the relative position, in the message, of the packet pointed at by a pointer with the intermediate status of premature eligibility is lower than or equal to the maximum chaining position, changing the intermediate status of premature eligibility into an intermediate status of eligibility, and resuming the analysis of the stack at the allocated pointer that has undergone the change in status.

16. The method according to claim 15, implemented with packets whose service information field also provide information on their length, wherein the method comprises the following steps:

as soon as a deposition fails changing the status of a pointer allocated to the packet whose deposition has failed, from an intermediate status of eligibility into a definitive status of reject, searching in the stack for another allocated pointer corresponding to the packet for which the deposition has failed but which is assigned an intermediate status of redundancy.

* * * * *